US009774699B2

United States Patent
Ogilvie et al.

(10) Patent No.: US 9,774,699 B2
(45) Date of Patent: *Sep. 26, 2017

(54) SYSTEM AND METHOD FOR TRANSFORMING GRAPHICAL MODELS

(75) Inventors: Brian K. Ogilvie, Holliston, MA (US); Charles J. Devane, Upton, MA (US); Kiran Kumar Kintali, Natick, MA (US); Donald Paul Orofino, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 1857 days.

This patent is subject to a terminal disclaimer.

(21) Appl. No.: 11/231,387

(22) Filed: Sep. 20, 2005

(65) Prior Publication Data

US 2007/0067761 A1 Mar. 22, 2007

(51) Int. Cl.
*G06F 9/45* (2006.01)
*H04L 29/08* (2006.01)
(Continued)

(52) U.S. Cl.
CPC ............... *H04L 67/34* (2013.01); *G06F 8/34* (2013.01); *H04L 41/22* (2013.01)

(58) Field of Classification Search
USPC ................... 703/13, 21; 717/120, 106, 140; 702/183; 716/1; 715/763
(Continued)

(56) References Cited

U.S. PATENT DOCUMENTS 5,586,020 A 12/1996 Isozaki
6,658,630 B1 12/2003 Threatt et al.
(Continued)

FOREIGN PATENT DOCUMENTS

EP 1387260 A1 2/2004
WO 2004/042499 5/2004

OTHER PUBLICATIONS

MathWorks_V5, "StateFlow and Stateflow Coder"—User's Guide, Version 5, copyright 1997-2002, http://www.caspur.it/risorse/softappl/doc/matlab_help/pdf_doc/stateflow/sf_ug.pdf, pp. 1-772 (Stateflow_Coder_v5.pdf).*

(Continued)

*Primary Examiner* — Tuan Vu
(74) *Attorney, Agent, or Firm* — Harrity & Harrity, LLP

(57) ABSTRACT

A mechanism for converting a graphical model of a system into an intermediate representation (IR) of a model is discussed. The mechanism alters the IR, and uses the altered IR to create a new or updated graphical model of the system that may be viewed and simulated by a user. Once the user is satisfied with the alterations to the IR, the IR or the graphical model may be used to generate code in a target language to enable the building of the physical system being designed. The use of the altered IR to generate a new or updated graphical model allows a more efficient and customizable design and simulation process than is typically found by simulating code that has been converted to target languages. The generation of the graphical model based on the altered IR allows a user to visually inspect the changes to the system, and the simulation of the graphical model based on the altered IR allows corrective action to be taken to account for any changes that occurred during the transformation of the model.

33 Claims, 6 Drawing Sheets

(51) Int. Cl.
*H04L 12/24* (2006.01)
*G06F 9/44* (2006.01)

(58) Field of Classification Search
IPC .................................. G06F 8/34; H04L 67/34
See application file for complete search history.

(56) References Cited

U.S. PATENT DOCUMENTS

| | | | |
|---|---|---|---|
| 6,684,388 B1 | 1/2004 | Gupta et al. | |
| 6,848,100 B1 | 1/2005 | Wu et al. | |
| 6,883,147 B1* | 4/2005 | Ballagh et al. | 716/1 |
| 6,901,579 B1 | 5/2005 | Suguta | |
| 6,968,544 B1 | 11/2005 | Schneider | |
| 7,103,526 B2* | 9/2006 | Allen et al. | 703/21 |
| 7,162,710 B1 | 1/2007 | Edwards et al. | |
| 7,197,743 B2* | 3/2007 | Borg et al. | 717/120 |
| 7,260,501 B2* | 8/2007 | Pattipatti et al. | 702/183 |
| 7,318,014 B1* | 1/2008 | Molson et al. | 703/13 |
| 7,340,684 B2* | 3/2008 | Ramamoorthy et al. | 715/763 |
| 2002/0022905 A1 | 2/2002 | Erlanoen et al. | |
| 2003/0014743 A1 | 1/2003 | Cooke et al. | |
| 2003/0046658 A1* | 3/2003 | Raghavan et al. | 717/106 |
| 2003/0233640 A1 | 12/2003 | Reynaud | |
| 2004/0006584 A1 | 1/2004 | Vandeweerd | |
| 2004/0088685 A1 | 5/2004 | Poznanovic et al. | |
| 2004/0205726 A1 | 10/2004 | Chedgey et al. | |
| 2005/0198577 A1 | 9/2005 | Presler-Marshall et al. | |
| 2006/0064680 A1 | 3/2006 | Devane et al. | |

OTHER PUBLICATIONS

Pohl et al, "Logarithmic Arithmetic for Real Data Types and Support for Matlab/Simulink Based Rapid-FPGA-Prototyping" IEEE 2003, p. 1-6 (FPGA_Pohl.pdf).*

Simulink, "Model-Based and Syatem-Based Design", Using Simulink, Version 5, copyright 1990-2002, 472 pg <SimulinkV5.pdf>.*

MathWorks_V5, "StateFlow and Stateflow Coder"—Users Guide, Version 5, copyright 1997-2002, pp. 1-772 <MW_SFC5>.*

Coleman et al, "Optimization Toolbox: User's Guide", version 2, copyright 1990-1999, 305 pages <optimToolb_99.pdf>.*

Golin, Eric J. et al., "A Visual Design Environment," *Proceedings of the 1993 IEEE/ACM international conference on Computer-aided design*, Santa Clara, CA, pp. 364-367 (1993).

Written Opinion for Application No. PCT/US2006/036420, dated Jul. 2, 2007.

International Search Report for Application No. PCT/US2006/036420, dated Jul. 2, 2007.

Leping, Bu et al., "A Simulated Training System of Power Based on Interaction between C# Programs and Simulink," 2011 Asia-Pacific Power and Energy Engineering Conference (APPEEC), pp. 1-4 (2011).

Kahn, "The Semantics of Simple Language for Parallel Programming," In Information Processing 1974, 6 pages.

Gupta, "The Spark Intermediate Representation," May 15, 1988, 2 pages, http:/mesl.ucsd.edu/spark/methodology/HTGs.shtml.

"Real-Time Workshop for Use with Simulink, Getting Started, Version 6," The MathWorks, Inc., 2004, 130 pages.

"Target Language Complier, For Use with Real-Time Workshop, Reference Guide, Version 5," The MathWorks, Inc., Chpt. 1, pp. 1-1-1-24, 2002.

Brisk, "Instruction Generation and Regularity Extraction for Reconfigurable Processors," Proceedings of the 2002 International Conference on Compliers, Architecture, and Synthesis for Embedded Systems, pp. 262-269, 2002.

Lee et al., "A Conditional Resource Sharing Method for Behavioral Synthesis of Highly Testable Data Paths," Proceedings of the IEEE International Test Conference on Designing, Testing, and Diagnostics, pp. 744-753, 1993.

International Search Report and Written Opinion for Application No. PCT/US2005/033863, dated Mar. 9, 2010.

Gajski et al., "High-Level Synthesis, Introduction to Chip and System Design," Kluwer Academic Publishers, Boston, pp. 137-177, 1992.

Aho et al., "Compliers, Principles, Techniques, and Tools," Addison-Wesley, Mar. 1986, 8 pages.

* cited by examiner

SYSTEM AND METHOD FOR TRANSFORMING GRAPHICAL MODELS

RELATED APPLICATION

The present application is related to a pending U.S. patent application Ser. No. 11/130,476, filed May 16, 2005, entitled "Extensible Internal Representation of Systems With Parallel and Sequential Implementations", the disclosure of which is incorporated by reference herein in its entirety.

FIELD OF THE INVENTION

The illustrative embodiment of the present invention relates generally to graphical models and more particularly to a system and method for utilizing intermediate representations of graphical models during graphical model design.

BACKGROUND

Real-life physical systems are frequently designed with the aid of graphical computer models. The designer attempts to design the graphical model so that it represents the attributes and functionality of the system being designed. Once the designer is satisfied with the design of the graphical model, the graphical model frequently serves as the basis for code generation in a target language with the code being used to construct the physical system represented by the graphical model. An example of this process is the conversion of graphical models into VHDL, Verilog and other hardware description languages during the design of integrated circuits. The graphical model may first be converted into an intermediate representation (IR) of the graphical model before being converted into the target language.

Unfortunately, the conversion of graphical models directly into a target language, with or without first converting the graphical model into an IR, suffers from a number of drawbacks. It is frequently desirable to simulate the performance of the system before building the physical model. HDL (hardware description language) simulations and other target language simulations tend to run more slowly and require more resources than simulations in a graphical programming environment. Additionally, if an IR is being used to translate the graphical model into a target language, it would be desirable to validate the translation of the graphical model into the IR and simulate a graphical model based on the IR to make sure no undesirable behavioral changes have been introduced to the model during the translation process.

SUMMARY OF THE INVENTION

The illustrative embodiment of the present invention provides a mechanism for converting a graphical model of a system into an intermediate representation (IR) of the model, altering the IR, and then using the altered IR to create a new or updated graphical model of the system that may be viewed and simulated by a user. Once the user is satisfied with the alterations to the IR, the IR or the graphical model may be used to generate code in a target language to enable the building of the physical system being designed. The use of the altered IR to generate a new or updated graphical model allows a more efficient and customizable design and simulation process than is typically found by simulating code that has been converted to target languages. The generation of the graphical model based on the altered IR allows a user to visually inspect the changes to the system, and the simulation of the graphical model based on the altered IR allows corrective action to be taken to account for any undesirable changes that occurred during the transformation of the model.

In one aspect of the present invention, a method of transforming graphical models includes the step of providing a graphical model. The method further includes the step of converting the graphical model into an intermediate representation (IR). The IR is suitable for conversion to a target language. Additionally, the method alters the IR of the graphical model and converts the altered IR into a graphical model.

In another aspect of the present invention, a system for transforming graphical models, includes a graphical programming environment. The graphical programming environment includes a graphical model. The system also includes a first conversion process that converts the graphical model into an intermediate representation (IR). The IR is suitable for conversion to a target language. Additionally, the system includes a second conversion process. The second conversion process converts an altered version of the IR into a graphical model.

In one aspect of the present invention, a method of transforming graphical models includes the step of providing a graphical model in a first language The method also converts the graphical model into an intermediate representation (IR). The IR is suitable for conversion to a target language different than the source language. The method additionally converts the IR into a graphical model in the target language.

In one aspect of the present invention, a method of transforming graphical models includes the step of providing a graphical model in a first language. The method converts the graphical model into an intermediate representation (IR). The IR is suitable for conversion to a target language different than the source language. The method additionally converts the IR into a new graphical model in the first language and simulates the new graphical model. The method also converts the IR into a graphical model in the target language.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The computer-aided design of physical systems is an iterative process in which the designer frequently makes multiple revisions to the model before finalizing the model. The illustrative embodiment of the present invention allows these revisions to be made upon an intermediate representation (IR) of the graphical model and then converts the altered IR to a graphical model for review and simulation by the designer. The mechanism of altering the IR and then generating a new or updated graphical model based on the IR allows both the altering and review of the model to take place more efficiently and in a more customizable fashion than conventional methods of converting the graphical model into a final intended target language for review or simulation.

Figure 1A:
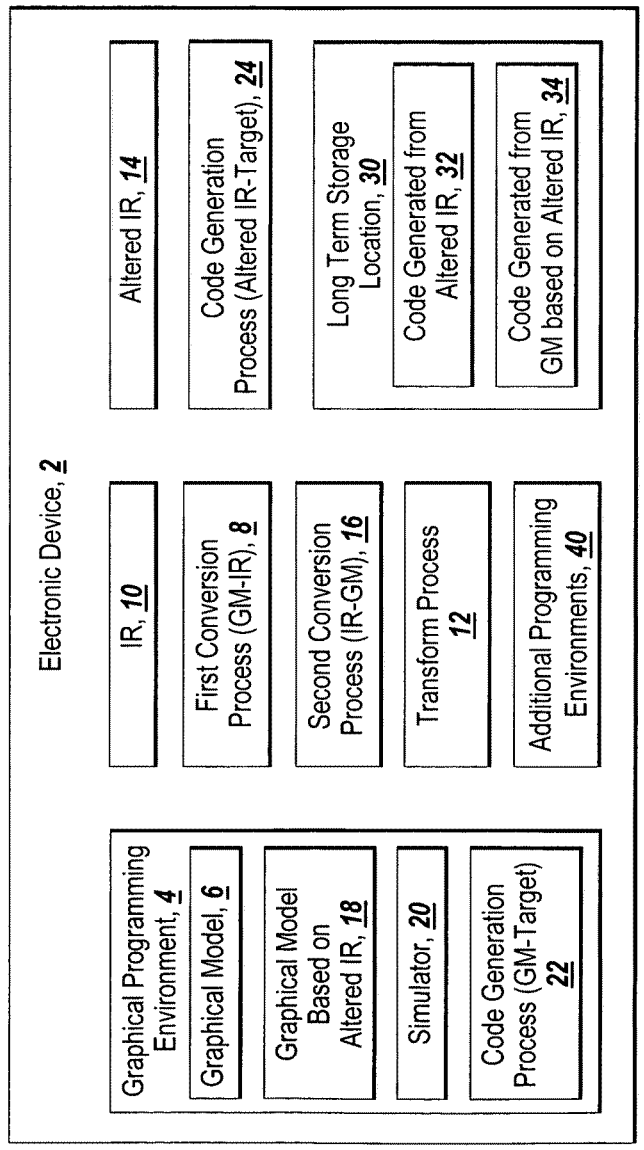
FIG. 1A depicts an environment suitable for practicing the illustrative embodiment of the present invention.

FIG. 1A depicts an environment suitable for practicing the illustrative embodiment of the present invention. An electronic device 2 hosts a graphical programming environment 4. The electronic device 2 may be a desktop, workstation, mainframe, server, laptop, PDA or some other electronic device equipped with a processor and capable of hosting the graphical programming environment 4. The graphical programming environment 4 may be a block diagram environment such as Simulink from The MathWorks, Inc. of Natick, Mass., a statechart environment such as Stateflow from The MathWorks, Inc. or a graphical circuit design environment such as Design Architect from Mentor Graphics Corporation of Wilsonville, Oreg. The graphical programming environment 4 includes a graphical model 6 such as a statechart, block diagram or electric circuit diagram. Alternatively, the graphical model could be a model of a mechanical or biological system. A first conversion process 8 on the electronic device 2 is used to create an IR 10 of the graphical model 6. The IR 10 is a memory capture of the graphical model 6 and may be stored as a graph with nodes and edges.

A transform process 12 on the electronic device 2 may be used to perform transforms that alter the IR 10. The IR 10 may also be exposed to additional programming environments 40 such as MATLAB from The MathWorks, Inc. or LABVIEW from National Instruments of Corporation of Austin, Tex. The alteration of the IR 10 is discussed in further detail below. A second conversion process 16 is used to convert the altered IR 14 into a graphical model that is generated from the altered IR 18. Those skilled in the art will recognize that first conversion process 8 that is used to convert the graphical model 6 into the IR 10 and the second conversion process 16 that is used to convert the altered IR 14 into the graphical model generated from the altered IR 18 may be part of the same software tool.

The graphical model that is generated from the altered IR 18 may be a new graphical model or an update of the graphical model 6 that was originally used as the basis for the IR 10. The graphical model that is generated from the altered IR 18 may be displayed and visually inspected by a user. Additionally, the graphical programming environment 4 may include a simulator 20 that may be used to simulate the operation of the physical system being modeled. A user may review the simulation to ensure the translation of the graphical model 6 into the IR did not adversely affect the system behavior and that the alterations/transformations to the IR 10 resulted in an intended result.

Once the designer is satisfied with the look and performance of the graphical model generated from the altered IR 18, the graphical model generated from the altered IR 18 may be translated by a code generation process 22 into code in a target language such as VHDL, Verilog, SystemC, C, C++, Java or M code that is used in the construction of the physical system. Alternatively, a different code generation process 24 may used to translate the altered IR 14 directly into code in the target language. A long term storage location 30 on the electronic device 2 or accessible to the electronic device 2 may be used to store the code generated from the altered IR 32 or the code generated from the graphical model based on the altered IR 34.

Figure 1B:
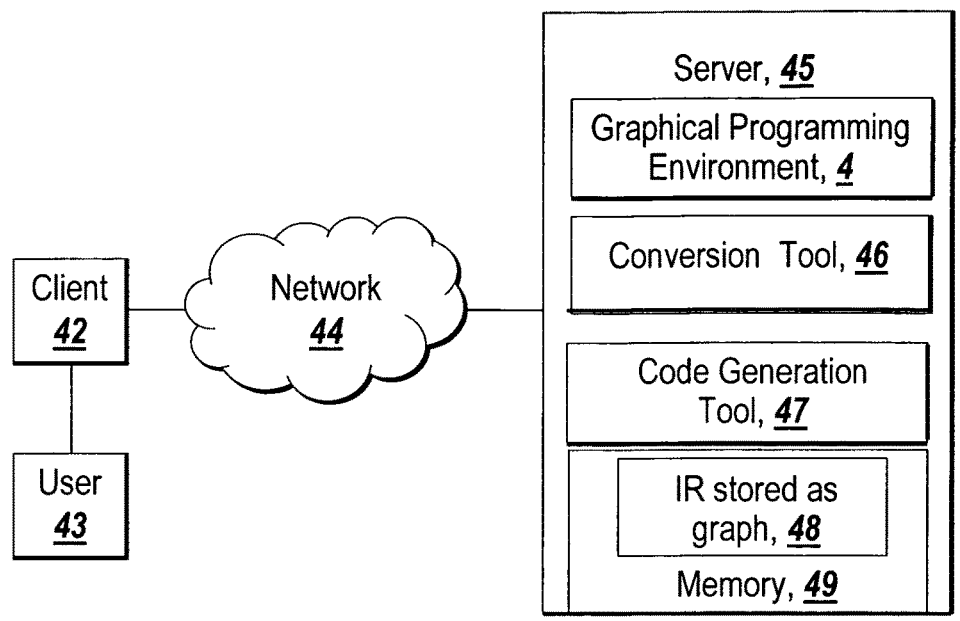
FIG. 1B depicts an alternate distributed environment suitable for practicing the illustrative embodiment of the present invention.

Although all of the components of the present invention discussed in reference to FIG. 1A have been depicted as being located on a single electronic device 2, it will be appreciated by those skilled in the art that other implementations are also possible within the scope of the present invention. For example, one or more of the graphical programming environment 4, the additional programming environments 40, the conversion processes 8 and 16, code generation processes 22 and 24 and the long term storage location 30 may be in communication over a network from different physical locations. FIG. 1B depicts an example of an alternative distributed environment suitable for practicing the illustrative embodiment of the present invention. A client system 42 that is being accessed by a user 43 communicates over a network 44 with a server 45. The network 44 may be the Internet, a local area network (LAN), wide area network (WAN) or some other type of network. The server hosts the graphical programming environment 4 of the present invention and a conversion software tool 46 combining the first and second conversion processes discussed in FIG. 1A above. Similarly, the server 45 hosts a code generation software tool 47 combining the first and second code generation processes discussed in FIG. 1A above. The server 45 may store the IR as a graph 48 in memory 49. The user 43 enters commands at the client and receives output from the processing of the graphical model that is taking place on server 45.

Figure 2:
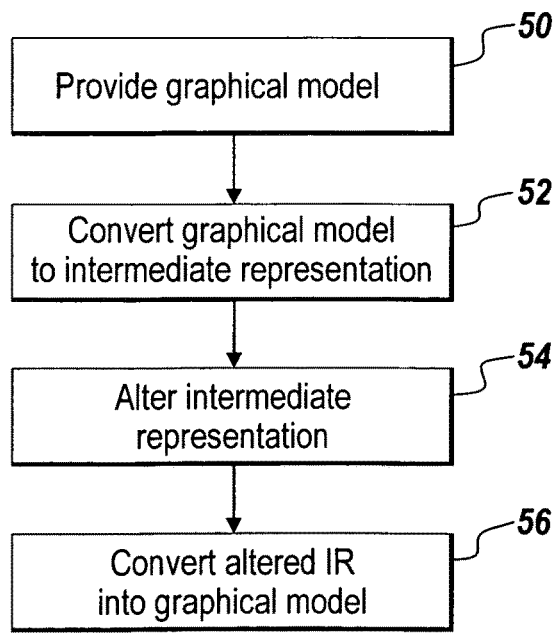
FIG. 2 is a flowchart of the sequence of steps followed by the illustrative embodiment of the present invention to convert a graphical model into an IR (intermediate representation) of the graphical model, alter the IR and convert the altered IR back into graphical model.

The overall sequence of steps followed by the illustrative embodiment of the present invention in order to create a new or updated graphical model 18 based on an altered IR 14 is depicted in FIG. 2. The sequence begins with the provision of graphical model 6 such as a system model (step 50). The graphical model 6 is then converted into an IR 10 of the graphical model (step 52). The process by which the graphical model 6 is converted into the IR 10 is discussed further below. Once the IR 10 is created, a number of types of well-know transforms may be performed on the IR to produce an altered IR representation 14 (step 54). For example, the transforms may be lowering transforms, elaboration transforms or optimization transforms. The alteration of the IR may take place by exposing the IR 10 to another programming environment 40. The altered IR 14 is then converted into a new or updated graphical model 18 (step 56). In an aspect of the illustrative embodiment, following the altering of the IR 10, the second conversion process 16 generates a set of modifications that are applied to the original graphical model 6 rather than creating a new graphical model.

The first conversion process 8 receives the graphical model 6 written in a source language and translates the file into an IR 10. The IR 10 of the present invention is usually, although not required to be, in a source and target language independent format, such that data contained within the IR is not specific to the source language from which it was generated. The data contained within the IR 10 may be used for subsequent code generation and the eventual generation of a representation of the data using a target language.

The first conversion process 8 is capable of converting a source language of one of a variety of types into one or more intermediate representations, such that various system models can be used to describe individual behaviors of the modeled system using the most applicable language for the desired results. The first conversion process 8 of the present invention is therefore capable of translating these various source languages into a single IR 10 for use in conversion into the target language.

The translation of the source language of the graphical model 6 to the IR 10 can be completed using numerous means recognized by those skilled in the art. One suitable example is the Real-Time Workshops® (RTW) coder, offered by The MathWorks, Inc. Using the RTW coder the source language of the graphical model 6 is analyzed and converted into an IR 10 wherein the file contained within the IR is in a source and target language independent format. The RTW coder, or other suitable process, walks the graphical model data structures, retrieves the records and generates the IR. This intermediate model file includes a hierarchical structure of records describing systems and their blocks and connections analyzed from a block diagram model of the source file. One skilled in the art will readily conceive how to construct such records from the data structures of the graphical model. The use of the RTW coder is a representative example, and those skilled in the art will readily recognize that the intermediate representation can be generated using numerous coding mechanisms for processing serial and parallel source languages.

Once the IR 10, which can vary in its degree of abstraction from the graphical model, has been created from the graphical model 6, the present invention allows the IR to be altered as part of the system design process. The altered IR 14 serves as the basis for a new or updated graphical model 18. The designer is able to view and/or simulate the new or updated graphical model 18 to verify the behavior of the system model. The illustrative embodiment exposes the manner in which the IR is altered which allows the customization of the process by the system designer. For example, the designer is able to plug in a transform from a design environment or substitute a vendor library containing a different transform. The designer can change the operations based on the result of each design iteration. As an example, a SIMULINK block diagram model may changed to an IR, altered and changed back to a new SIMULINK model. Following simulation, the process may be repeated in the event of an unwanted result with an alteration to the new model or a replacement alteration to the original model with the process being repeated as many times as necessary.

Figure 3:
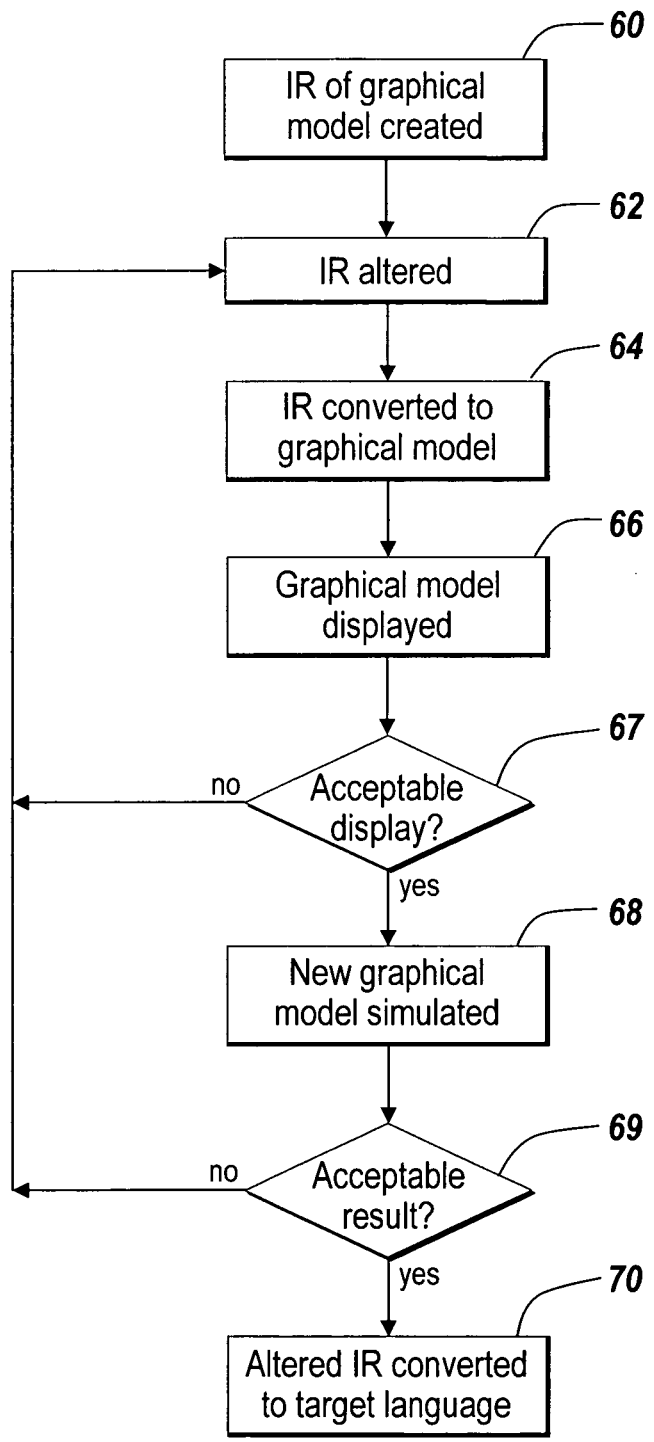
FIG. 3 is a flowchart of the sequence of steps followed by the illustrative embodiment of the present invention to iteratively alter an IR until a graphical model satisfactory to a user is generated.

FIG. 3 depicts the iterative sequence of steps that may be followed by the present invention to allow the designer to produce an acceptable system model prior to the translation of the system model (or its IR) into a target language needed to produce the physical system. The sequence begins with the creation of the IR 10 based on the graphical model 6 (step 60). The IR 10 is then altered such as by applying a transform operation to the IR (step 62). The altered IR 14 is then converted to a graphical model 18 (step 64). In implementations using the Real-Time Workshop© coder discussed above, the RTW coder converts the IR back into a graphical model such as a Simulink model by examining the created hierarchical structure of records in the IR that describe systems and their blocks and connections. The information is used to create or update a block diagram model from the altered IR. The created/updated graphical model based on the altered IR 18 is then displayed to the system designer (step 66). The illustrative embodiment thus provides the designer the opportunity to visually inspect changes to the system model that were made to the IR, prior to the translation of the system model to a target language.

If the display of the system model depicted in the graphical model based on the altered IR 18 reveals an unacceptable change to the designer (step 67), the process iterates and the designer may alter the IR 10 or further alter the previously altered IR 14 (step 62). If the visual inspection is acceptable to the designer (step 67) the designer may then cause the graphical programming environment 4 to simulate the graphical model based on the altered IR 18 (step 68). The illustrative embodiment thus also provides the system designer the opportunity to inspect the results of the simulation of the system model following changes to the IR, prior to the translation of the system model to a target language. If the simulation results are not acceptable to the system designer, the process iterates and the designer may alter the IR 10 or further alter the previously altered IR 14 (step 62). If the changes are acceptable to the system designer after observing the simulation results, the target language code may be generated (step 70), either by the code generation process 22 generating the target language code from the graphical model based on the altered IR 18 or the code generation process 24 generating the target code directly from the altered IR 14.

It will be appreciated, that the actual sequence of steps followed to utilize the IR may vary from that shown in FIG. 3 while still remaining within the scope of the present invention. For example, following the creation of the IR and display of the graphical model based on the IR (steps 62 and 64), the user may decide (step 67) to create a new graphical model (step 60) rather than altering the IR (step 62). Alternatively, the user may choose to alter the way the IR is converted into a graphical model (step 64) rather than altering the actual IR (step 62). These and similar alternatives are expressly considered to be within the scope of the present invention.

Figure 4A:
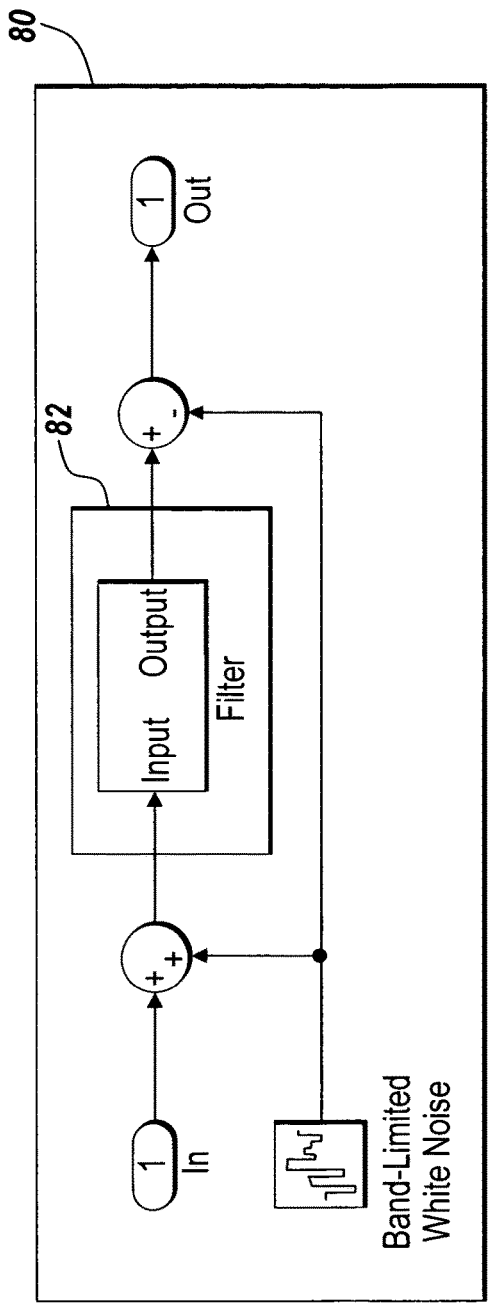
FIG. 4A is block diagram of a system.
Figure 4B:
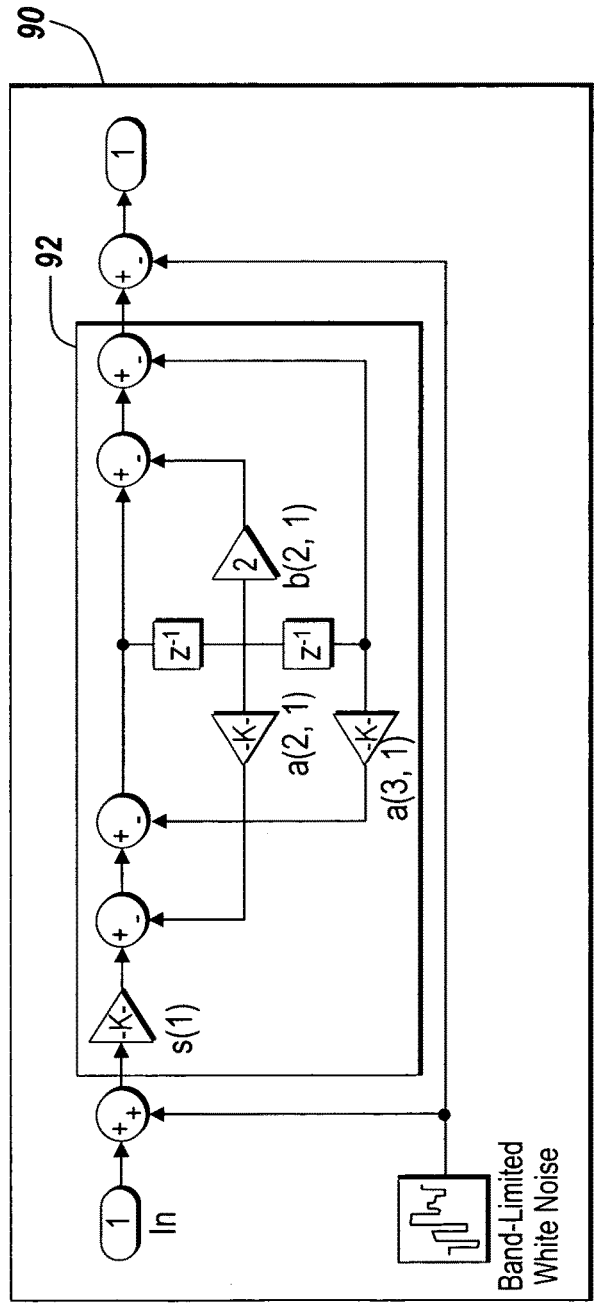
FIG. 4B is a block diagram of the system of FIG. 4A following alteration to an IR based on the system.

The altering of the IR 10 may take many forms and may result in behavioral changes in the model such as numerical or latency changes. Alternatively, the alteration of the IR may preserve the numerical and timing characteristics of the original model resulting in no behavioral changes. FIGS. 4A and 4B depict the effects of the application of a transform to a portion of an IR 10 of a system. FIG. 4A depicts a system 80 prior to the application of the transform. The system 80 includes a filter 82. A lowering transform (which lowers the level of abstraction), is applied to the IR 10 of the system, specifically to the portion of the IR representing the filter 82. The lowering transform breaks down the complicated operation of the filter 82 into simpler operations. Following the application of a lowering transform to the filter 82 in the IR 10, the altered IR 14 is converted into a graphical model based on the altered IR 18, specifically the system 90 represented in FIG. 4B. The application of the lowering transform to the IR creates a simplified system 90, wherein the filter 82 has been replaced by a series of simpler functions 92. Those skilled in the art will recognize that there exist numerous other applicable transforms (such as optimization and elaboration transforms) for use with the current invention.

Figure 5A:
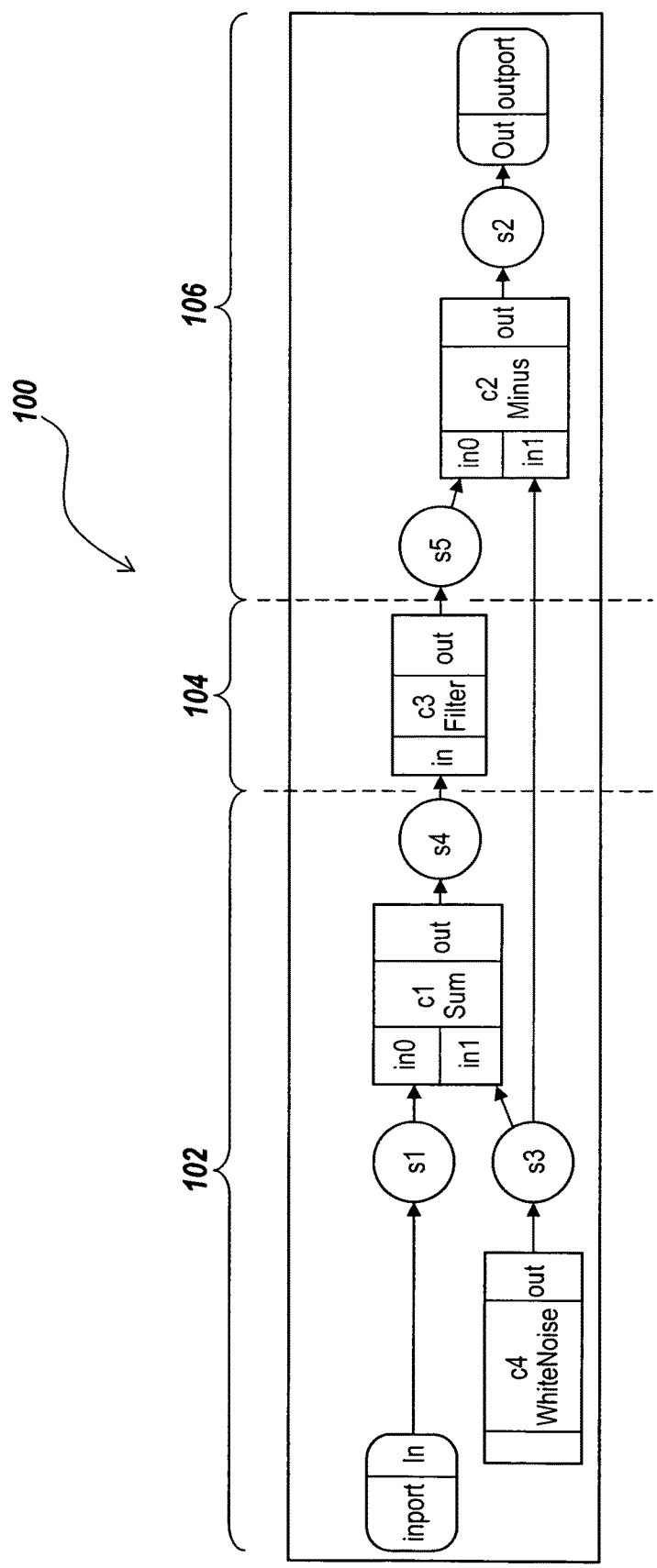
FIG. 5A depicts an IR representation for the block diagram of FIG. 4A.
Figure 5B:
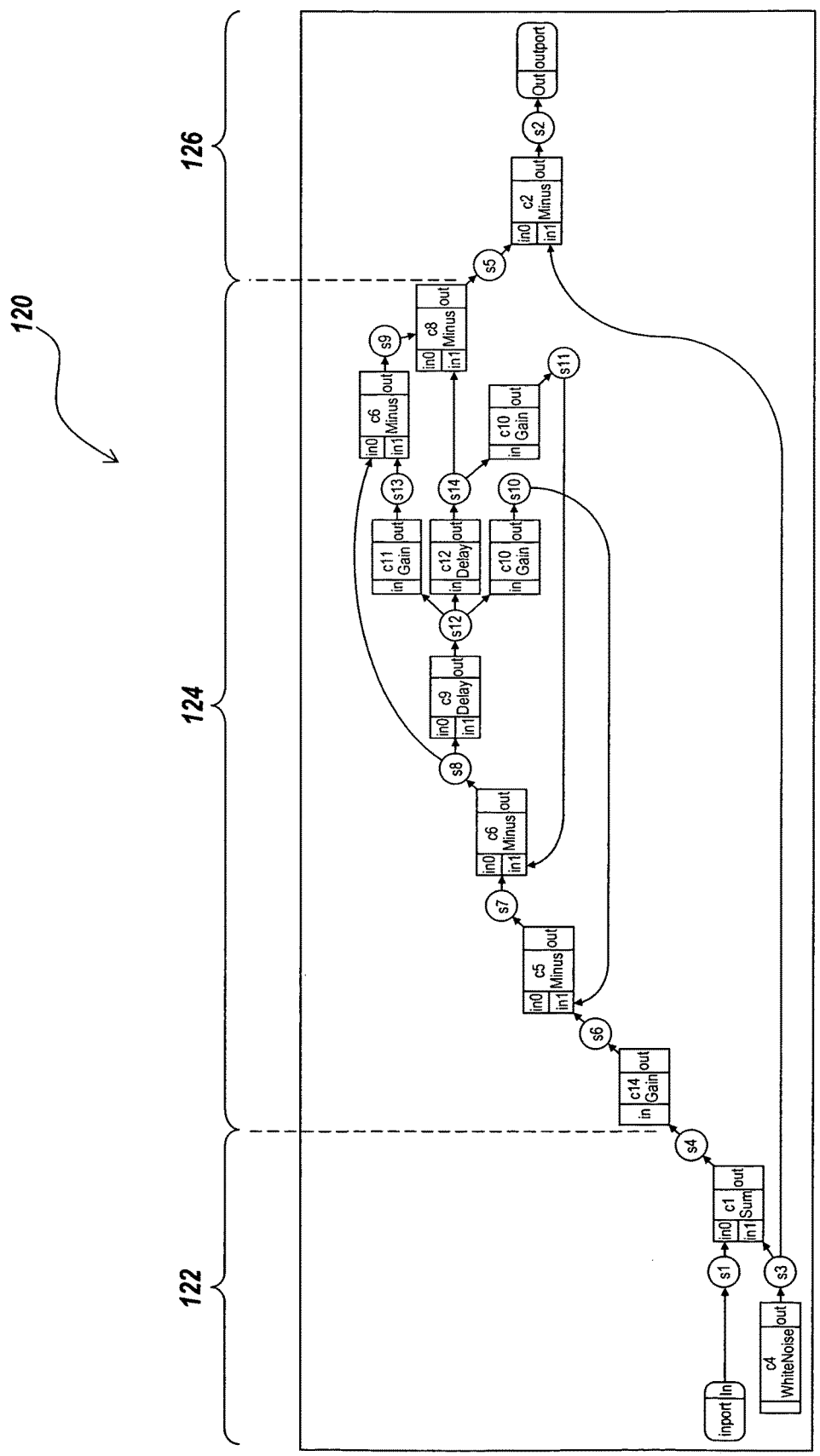
FIG. 5B depicts an IR representation for the block diagram of FIG. 4B.

FIGS. 5A and 5B are IRs of the graphical models depicted in FIGS. 4A and 4B respectively. FIG. 5A shows an IR 100 for the system 80 depicted in FIG. 4A. Following the application of a lowering transform to the IR 100 of the system 80, the IR 120 of FIG. 5B is produced. FIG. 5B includes sections 122 and 126 which directly correspond to sections 102 and 106 of FIG. 5A. The lowering transform has been applied to section 104 of the IR 100 in FIG. 5A to produce section 124 of FIG. 5B. Section 104 of the IR 100 in FIG. 5A (the section to which the lowering transform is applied) corresponds to the filter 82 depicted in FIG. 4A. The IR 120 in FIG. 5B may then be used to regenerate the graphical model of the system 90 depicted in FIG. 4B where the expanded filter 92 corresponds to section 124 in FIG. 5B.

In one aspect of the illustrative embodiment, the IR 10 is exposed to additional programming environments 40 such as MATLAB. The additional programming environments may allow extensibility of the transformations, vendor-specific optimizations, metrics and predictions. In another aspect of the illustrative embodiment, the transformations may be dictated by one or more user-specified configuration sets that include changes that change numerical or timing behaviors of the modeled systems. Thus the transformation may be performed by a plug-in process supplied by a vendor or a user. Alternatively, the transformation may be manually controlled and dictated by a user.

The code generation processes 22 and 24 may translate the altered IR 10 (or the graphical model based on the altered IR 18) into the intended target language. For illustrative purposes, a single code generation process 22 or 24 have been shown resulting in a single collection of code generated from the altered IR 32 (or code generated from the graphical model based on the altered IR 34). It will be appreciated that the code generation processes 22 and 24 are capable of generating multiple graphical or textual programs written in a desired target language. It will be appreciated that a graphical model target language will usually be different than the original source language. The generated target file(s) can further be used to fabricate an electronic circuit using automated microprocessor manufacturing techniques understood by those skilled in the art. In another aspect of the illustrative embodiment, the code generation processes 22 and/or 24 may output a target language in C or C++ format. The target language can then be used with an external compiler to generate executable code as required.

The illustrative embodiment of the present invention may also provide configurable control over access to the IR. The type of operations performed on the IR and the threshold issue of access to the IR may be set by an administrator or other authorized individual. The limitation of access to the IR can be used to impose restraints on members of the development team during the design process.

Although the examples contained herein have been made with reference to a graphical modeling environment, it should be appreciated that the illustrative embodiment of the present invention may be practiced in the absence of a graphical modeling environment. Thus, a program may read a graphical model file, construct an IR, and then generate an output file without the graphical model being displayed in a graphical modeling environment.

Similarly, it should be appreciated that although many of the examples contained herein have discussed the alteration of the IR, the present invention may be practiced without altering the generated IR. For example, the generation of the IR provides a user an opportunity to view the model data and structure in a different form before the generation of an output model in a different language, an option that may prove useful to the user even without any alteration of the IR. Additionally, the generation of an output model in such a scenario may be easier from the IR format than generating the output model directly from the graphical model.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, C, C++, C#, or JAVA. The software programs may be stored on or in one or more mediums as object code.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method implemented with at least one processor equipped with memory units having stored thereon executable program instructions, which when executed by the processor, cause the processor to perform the method steps, comprising:
   providing a first graphical model representing a system, the first graphical model being in a source language compatible with a graphical programming environment;
   converting, with a computing device, the first graphical model into an intermediate representation (IR),
      data contained in the IR being non-specific to the source language of the first graphical model, and
      converting the first graphical model into the IR including:
         generating records associated with the IR,
            the records describing blocks and connections analyzed from a source file associated with the first graphical model;
   performing an optimization transformation on the IR to produce an altered IR by exposing the IR to another programming environment,
      the other programming environment being different from the graphical programming environment, and
      producing the altered IR altering the records associated with the IR,
         the altered records including information that indicates modifications that produce the altered IR;
   generating, using the computing device, a second graphical model based on the first graphical model and the altered records.

2. The method of claim 1, where the IR is stored as a graph.

3. The method of claim 1, where the optimization transformation changes a behavior of the system being represented by the first graphical model.

4. The method of claim 1, where the optimization transformation includes at least one of numerical changes or latency changes.

5. The method of claim 1, where the optimization transformation results in an elaboration of how the IR represents the system.

6. The method of claim 1, where the optimization transformation lowers a level of abstraction of the system represented by the IR.

7. The method of claim 1,
where the optimization transformation optimizes the first graphical model, and
where the optimization transformation is reflected in the second graphical model.

8. The method of claim 1, where a user specifies the optimization transformation.

9. The method of claim 1, where the optimization transformation employs at least one user-specified configuration.

10. The method of claim 1, where the second graphical model is an updated version of the first graphical model.

11. The method of claim 1, further comprising:
performing a simulation of the second graphical model.

12. The method of claim 11, further comprising:
generating code from the altered IR following the simulation of the second graphical model.

13. The method of claim 12, where the generated code is at least one of Verilog, VHDL, SystemC, C, C++, Java, or M code.

14. The method of claim 1, where the second graphical model is in at least one of a block diagram language, a statechart language, or a graphical circuit design language.

15. The method of claim 1, where the second graphical model is in a language different from the source language of the first graphical model.

16. The method of claim 1, further comprising:
converting the second graphical model into more than one graphical model based on a programming language different than the source language of the first graphical model.

17. The method of claim 1, further comprising:
converting the second graphical model into a textual program.

18. The method of claim 1, further comprising:
converting the second graphical model based on the altered IR into more than one textual program.

19. The method of claim 1, further comprising:
providing configurable control over user and programmatic access to the IR.

20. A system comprising:
a computing device implemented with at least one processor coupled with memory-stored executable program instructions, which when executed by the processor, cause the processor to:
provide a first graphical model representing a system,
the first graphical model being in a source language that is compatible with a graphical programming environment;
convert the first graphical model into an intermediate representation (IR),
data contained in the IR being non-specific to the source language of the first graphical model, and
when converting the first graphical model into the IR, the computing device is to:
generate records associated with the IR,
the records describing blocks and connections analyzed from a source file associated with the first graphical model;
perform an optimization transformation on the IR to produce an altered IR by exposing the IR to another programming environment,
the other programming environment being different from the graphical programming environment,
when performing the optimization transformation, the computing device is to:
alter the records associated with the IR, and
the altered records including information that indicates modifications that produce the altered IR;
generate a second graphical model based on the first graphical model and the altered records; and
provide, for display, the second graphical model.

21. The system of claim 20, where the second graphical model is an updated version of the first graphical model.

22. The system of claim 20, where the graphical programming environment comprises:
a simulator for use in performing a simulation of the second graphical model.

23. The system of claim 20, where the computing device is further to:
generate code for the second graphical model.

24. A non-transitory computer-readable medium storing instructions, the instructions comprising:
one or more instructions that, when executed by at least one computing device, cause the at least one computing device to:
provide a first graphical model representing a system,
the first graphical model being in a source language compatible with a graphical programming environment;
convert the first graphical model into an intermediate representation (IR),
data contained in the IR being non-specific to the source language of the first graphical model,
the IR including records, and
the records describing blocks and connections analyzed from a source file associated with the first graphical model;
perform an optimization transformation on the IR to produce an altered IR by exposing the IR to another programming environment,
the altered IR including altered records, and
the altered records including information that indicates modifications that produce the altered IR;
generate a second graphical model based on the first graphical model and the altered records.

25. The non-transitory computer-readable medium of claim 24, where the IR is stored as a graph.

26. The non-transitory computer-readable medium of claim 24, where the optimization transformation changes a behavior of the system being represented by the first graphical model.

27. The non-transitory computer-readable medium of claim 24, where the second graphical model is an updated version of the first graphical model.

28. The non-transitory computer-readable medium of claim 24, where the instructions further comprise:
one or more instructions that, when executed by at least one computing device, cause the at least one computing device to:
perform a simulation of the second graphical model.

29. The non-transitory computer-readable medium of claim 24, where the instructions further comprise:
one or more instructions that, when executed by at least one computing device, cause the at least one computing device to:
generate code from the altered IR.

30. The non-transitory computer-readable medium of claim 24, where the instructions further comprise:

one or more instructions that, when executed by at least one computing device, cause the at least one computing device to:
generate code from the second graphical model.

31. The non-transitory computer-readable medium of claim 24, where the second graphical model is in one of a block diagram language, a statechart language, or a graphical circuit design language.

32. A method implemented with at least one processor equipped with memory units having stored thereon executable program instructions, which when executed by the processor, cause the processor to perform the method steps, comprising:
    providing, by a computing device, a first graphical model representing a system,
        the first graphical model being in a source language compatible with a graphical programming environment;
    converting, by the computing device, the first graphical model into an intermediate representation (IR),
        data contained in the IR being non-specific to the source language, and
        converting the first graphical model into the IR including:
            generating records associated with the IR,
                the records describing blocks and connections analyzed from a source file associated with the first graphical model;
    performing, by the computing device, an optimization transformation on the IR to produce an altered IR by exposing the IR to another programming environment,
        the other programming environment being different from the graphical programming environment, and
        producing the altered IR causing altered records to be produced,
            the altered records including information that indicates modifications that produce the altered IR; and
    generating, by the computing device, a second graphical model based on the first graphical model and the altered records.

33. A method implemented with at least one processor equipped with memory units having stored thereon executable program instructions, which when executed by the processor, cause the processor to perform the method steps, comprising:
    providing a first graphical model representing a system,
        the first graphical model being in a source language compatible with a graphical programming environment, and
        the providing the first graphical model being performed by a computing device;
    converting the first graphical model into an intermediate representation (IR),
        data contained in the IR being non-specific to the source language,
        the converting the first graphical model into the IR including:
            generating records associated with the IR,
                the records describing blocks and connections analyzed from a source file associated with the first graphical model, and
        the converting the first graphical model into the IR being performed by the computing device;
    performing an optimization transformation on the IR to produce an altered IR by exposing the IR to another programming environment,
        the other programming environment being different from the graphical programming environment, and
        the performing the optimization transformation being performed by a computing device;
    producing an altered IR based on performing the optimization transformation on the IR,
        the producing the altered IR altering the records associated with the IR to produce altered records associated with the altered IR,
            the altered records including information that indicates modifications that produce the altered IR, and
        the producing the altered IR being performed by the computing device;
    generating a second graphical model based on the first graphical model and the altered records,
        the generating the second graphical model being performed by the computing device; and
    simulating the second graphical model,
        the simulating the second graphical model being performed by the computing device.

* * * * *